United States Patent [19]

Wilson

[11] 4,097,790

[45] Jun. 27, 1978

[54] MOTOR PROTECTOR WITH REMOTE TEMPERATURE SIMULATION

[75] Inventor: Robert J. Wilson, Bolingbrook, Ill.

[73] Assignee: General Motors Corporation, Detroit, Mich.

[21] Appl. No.: 714,389

[22] Filed: Aug. 16, 1976

[51] Int. Cl.² .............................................. G05B 5/00
[52] U.S. Cl. ................................ 318/471; 318/221 C; 318/334; 318/472
[58] Field of Search ........... 318/142, 144, 158, 221 H, 318/221 C, 334, 471–473, 634, 641; 361/23–25, 27, 28, 30

[56] References Cited

U.S. PATENT DOCUMENTS

| | | |
|---|---|---|
| 3,629,676 | 12/1971 | Ephraim, Jr. et al. ............... 318/144 |
| 3,691,446 | 9/1972 | Ephraim, Jr. et al. ............... 318/472 |
| 3,809,960 | 5/1974 | Jossic .................................... 318/471 |
| 3,860,861 | 1/1975 | Gucker .................................. 318/473 |

*Primary Examiner*—Robert K. Schaefer
*Assistant Examiner*—Michael K. Mutter
*Attorney, Agent, or Firm*—Warren D. Hill

[57] ABSTRACT

To protect a motor from overheating, its temperature is simulated at a point remote from the motor and the motor voltage is controlled to prevent overheating. The simulator comprises a cube of copper carrying a pair of heating elements: one being heated by a current proportional to motor current and the other heated by a current proportional to motor power. A temperature detector on the cube detects temperature corresponding to critical motor temperatures and is used to control motor energization.

2 Claims, 3 Drawing Figures

MOTOR PROTECTOR WITH REMOTE TEMPERATURE SIMULATION

This invention relates to a motor protector having a temperature simulator for remotely detecting overheating conditions.

It has been previously been known to simulate the temperature of a motor in order to sense overheating conditions and to take corrective action while avoiding the expense and difficulty of directly measuring motor temperature. For example, U.S. Pat. to Ephraim, Jr. et al No. 3,629,676 discloses a traction motor temperature control which uses a temperature measurement of a motor shunt which carries the motor current. It has been found, however, that the arrangement according to that patent is unable to accurately track the motor temperature under certain motor operating conditions.

It is therefore a general object of the invention to provide a motor protector with an improved motor temperature simulator for accurately providing an analog of motor temperature.

It is another object of the invention to electronically control the temperature of such a motor temperature simulator to improve the accuracy of the motor protector.

The invention is carried out by simulating the temperature of a motor in a mass of heat conductive material which is heated by a pair of heating elements. A circuit responsive to motor current and voltage provides a motor current and a motor power signal respectively for energizing the heating elements in controlling the temperature of the heat conductive mass. A temperature detector senses the temperature of the mass and a control circuit responsive to that temperature controls the motor energization to prevent over temperature operation.

The above and other advantages will be made more apparent from the following specification taken in conjunction with the accompanying drawings wherein like reference numerals refer to like parts and wherein.

The term "temperature simulation" as used herein does not necessarily denote that the temperature of the simulator is identical to that of the motor rather it includes that condition where the temperature of the simulator is analogous to that of the motor; that is, it may be at a lower temperature than the motor but as the motor temperature changes, the simulator temperature changes in the same fashion so as to track the motor temperature under all motor operating conditions for which a given motor is intended. Whenever the motor enters or approaches an over temperature condition calling for corrective action, the simulator will accurately reflect that condition by achieving a corresponding temperature which causes corrective action by a motor control circuit.

Figure 1:
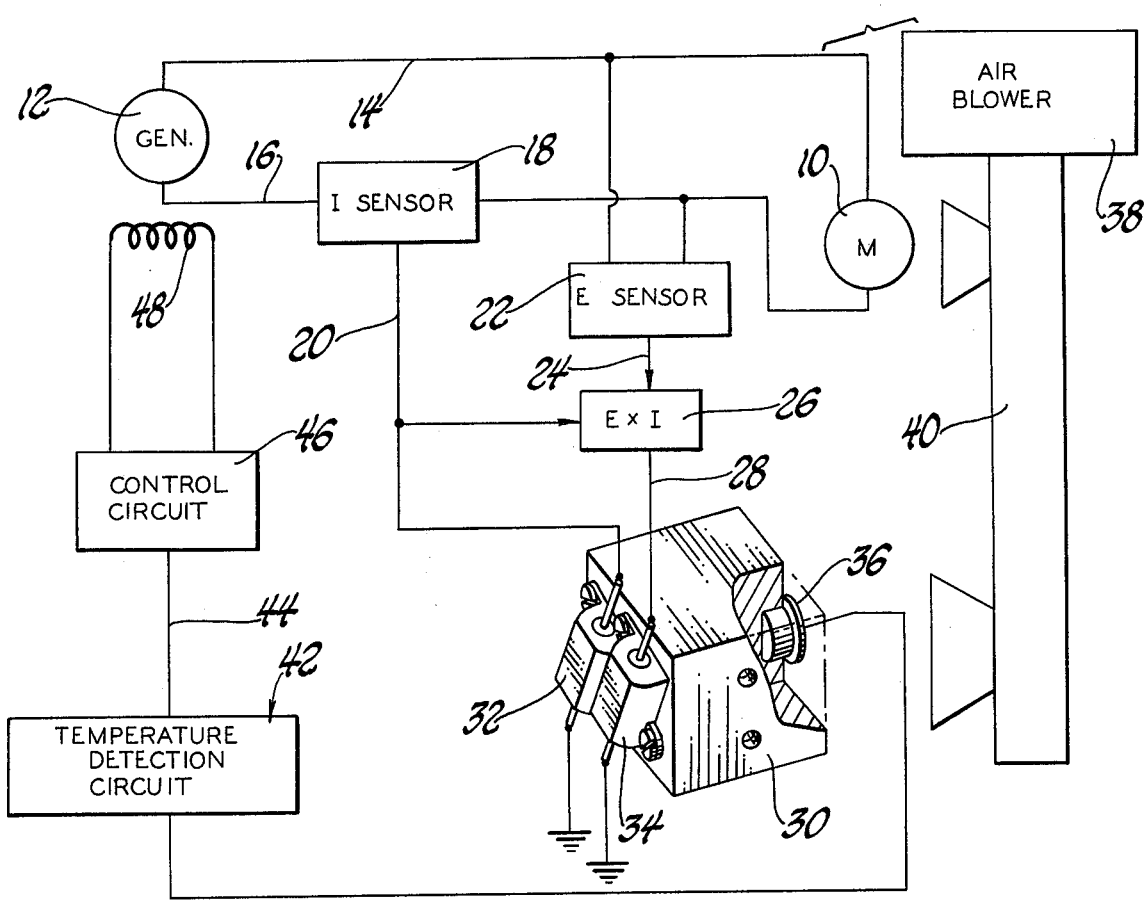
FIG. 1 is a diagrammatic illustration of a motor circuit including a motor protector according to the invention.

Referring to FIG. 1, a traction motor 10 for a locomotive is energized by a generator 12 which supplies power through lines 14 and 16 to the motor. A current sensor 18 provides an output signal on line 20 which is proportional to the motor current flowing through line 16. A voltage sensor 22 connected across lines 14 and 16 provides an output signal on line 24 proportional to motor voltage.

A multiplying circuit 26 connected to the lines 20 and 24 multiplies the motor current and voltage to obtain an output signal on line 28 proportional to the motor power. A block or cube 30 of heat conductive material, preferably copper, having a dimension of about 1 inch on each side has a pair of heating elements 32 and 34 fastened to one face of the block. The heating elements comprise 17.5 ohm, 5 watt resistors each encased in an aluminum extrusion. The opposite face of the cube 30 has embedded therein an integrated circuit temperature sensor 36 such as a National Semiconductor part number LX5600.

An air blower 38 connected to a duct 40 supplies cooling air which is forced through the motor 10 and which also is passed over the block 30 so that the motor and the block are subjected to the same cooling influence.

The voltage output of the temperature sensor 36 is applied to a temperature detection circuit 42 which provides an output on line 44 when an over temperature condition is encountered. A control circuit 46 having its input on line 44 responds to the detection of temperature condition to control the energization of the excitation of coil 48 of the generator 12. The control circuit 46 does not present a part of the present invention and is not disclosed in detail. There is, however, a circuit like that disclosed in the above mentioned U.S. Pat. No. 3,629,679.

Figure 2:
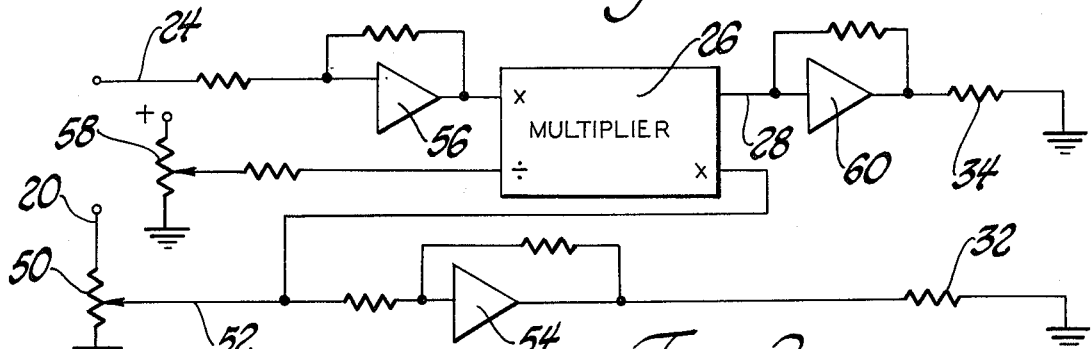
FIG. 2 is a schematic diagram of the circuit for heating the temperature simulator of FIG. 1.

FIG. 2 shows a circuit for controlling the heating of the block 30 by appropriately energizing the heating elements 32 and 34. The motor current signal on line 20 is fed through a potentiometer 50 to ground. The wiper of the potentiometer is connected by line 52 to amplifier 54, the output of which is connected to the heating element 32 which has one end grounded. The potentiometer 50 then allows the adjustment of the heating current.

The line 24 carrying the motor voltage signal is connected through an amplifier 56 to a multiplying input of the multiplier 26 while the line 52 is connected to another multiplier input. A divisor input to the multiplier input. A divisor input to the multiplier 26 is connected to the center tap of a potentiometer 58 which is connected between a positive voltage and ground. The multiplier output on line 28 is connected through an amplifier 60 and through the heating element 34 to ground. Thus the current energizing the element 34 is proportional to motor current times motor voltage divided by a scaling factor provided by potentiometer 58. The current flowing through the element 34 is proportional to the motor power but with the proportionality being determined by manual adjustment of potentiometer 58. It has been determined through experience that the arrangement as thus described does provide an accurate motor temperature simulator when the potentiometers 50 and 58 are properly adjusted. Such adjustment is carried out empirically so that each of the currents energizing the elements 32 and 34 are scaled as required to cause the temperature of the block 30 to track that of the motor.

Figure 3:
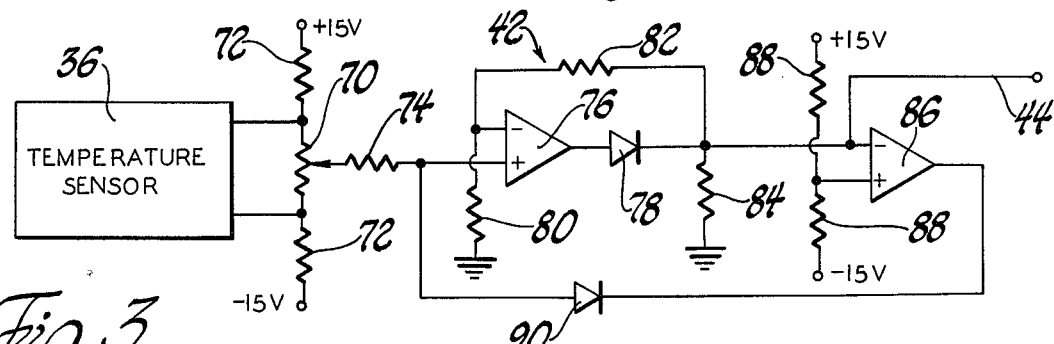
FIG. 3 is a schematic diagram of a temperature detector circuit according to FIG. 1.

FIG. 3 schematically illustrates the temperature detection circuit 42. The input to the detection circuit 42 comprises a potentiometer 70 having its ends connected through resistors 72 to a source of +15 volts and −15 volts. The ends of potentiometer 70 are connected to outputs of the temperature sensor 36. The temperature sensor output voltage varies with temperature so that for a given potentiometer setting, the potentiometer wiper will have a voltage dependent upon the sensed temperature of the block 30. The potentiometer wiper is connected through a resistor 74 to the positive input terminal of an operational amplifier 76. The amplifier output is connected through a diode 78 to the output line 44. The negative input terminal of the amplifier 76 is connected to ground through a resistor 80 and to the output line through feedback resistor 82. The ouput line is connected to ground through a resistor 84. An operational amplifier 86 has its negative terminal connected to the output line 44 and its positive input terminal connected to the midpoint of a voltage divider comprising resistors 88 connected between +15 volts and −15 volts. The output of the amplifier 86 is fed through a diode 90 to the positive input terminal of the amplifier 76.

In operation it is desirable to have the voltage on line 44 at zero volts for a motor equivalent temperature of, say, 175° C and below then linearly increase to a maximum value of 10 volts at 185° C. The value of 175° C is set by adjustment of the potentiometer 70 so that a positive output of the amplifier circuit just begins when the temperature sensor 36 senses the motor equivalent of 175° C. The relative values of the resistors in the amplifier circuit, of course, establish the amplifier gain thereby determining the temperature, preferably 185° C at which the value of 10 volts is reached. The potentiometer including the resistors 88 is selected so that a reference voltage of 10 volts is applied to the positive input terminal of the amplifier 86. When the voltage on line 44 is less than 10 volts, the output of the amplifier 86 is positive and is blocked by the diode 90. When, however, the voltage on line 44 tends to exceed 10 volts, then the output of the amplifier 86 rapidly goes negative to draw sufficient current from the input of the amplifier 76 to prevent an output signal exceeding 10 volts. The control circuit 46 of FIG. 1 responds to the output on line 44 to control the output of the generator 12 to a value which does not permit overheating of the motor 10. It is obvious that with this arrangement, the generator excitation may be gently moderated when the output voltage on line 44 is relatively low but that generator excitation may have to be significantly adjusted when the voltage on line 44 approaches 10 volts.

It will be seen that the motor protection circuit disclosed herein has the flexibility of adjustment to be set for tracking, at least in an analog fashion, the temperature of a motor located remotely from the simulator and with electronic control of the temperature simulator provides accurate control of temperature simulation and sensing.

The embodiments of the invention in which an exclusive property or privilege is claimed are defined as follows:

1. A motor protector located remotely from an electric motor that is subject to overheating comprising
 means for generating an analog of motor temperature including a block of heat conductive material, first and second electrical heating elements mounted in heat transfer relationship with the block of heat conductive material for heating the block of material when current is applied to either of the elements, the block of material having a predetermined thermal inertia due to its mass and its specific heat which represents the thermal inertia of the motor, means in circuit with the motor for supplying current proportional to motor current to the first heating element, and means in circuit with the motor for supplying current proportional to motor power to the second heating element, the heating effect of said heating elements and the thermal inertia of said block being such that the block of heat conductive material is heated to an analog temperature corresponding to the actual motor temperature over a varying range of motor current and power,
 a temperature detection element secured to the block of material in heat transfer relation therewith for responding to the temperature of said block, and
 a circuit including the temperature detection element responsive to the temperature of said block for controlling the energization of the motor to prevent overtemperature operation.

2. A motor protector located remotely from an electric motor that is subject to overheating comprising
 means for generating an analog of motor temperature including a block of heat conductive material, blower means for providing an airstream for cooling both the motor and the block of material, first and second electical heating elements mounted in heat transfer relationship with the block of heat conductive material for heating the block of material when current is applied to either of the elements, the block of material having a predetermined thermal inertia due to its mass and its specific heat which represents the thermal inertia of the motor, means in circuit with the motor for providing a motor current signal and an electronic circuit responsive thereto for supplying current proportional to motor current to the first heating element, means in circuit with the motor for providing a motor voltage signal, and a multiplier circuit responsive to the current and voltage signals for supplying current proportional to motor power to the second heating element, the heating effect of said heating elements and the thermal inertia of said block being such that the block of heat conductive material is heated to an analog temperature corresponding to the actual motor temperature over a varying range of motor current and power,
 a temperature detection element embedded in the block of material in heat transfer relation therewith for responding to the temperature of said block, and
 a circuit including the temperature detection element responsive to the temperature of said block for controlling the energization of the motor to prevent overtemperature operation.

* * * * *